Figure 1:
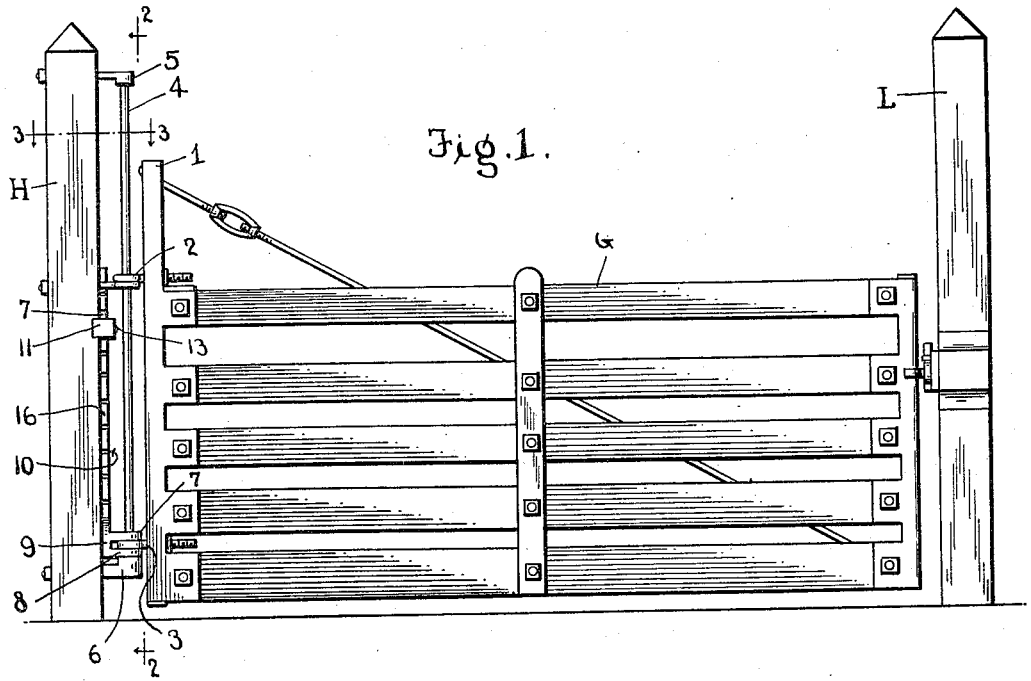

O. E. HESTER.
GATE HINGE.
APPLICATION FILED OCT. 25, 1912.

1,052,665.

Patented Feb. 11, 1913.

Witnesses
L. B. James
N. L. Collamer

Inventor
Otho E. Hester
By H. B. Willson &Co
Attorneys

UNITED STATES PATENT OFFICE.

OTHO EDWARD HESTER, OF VAN METER, IOWA.

GATE-HINGE.

1,052,665.   Specification of Letters Patent.   Patented Feb. 11, 1913.

Application filed October 25, 1912. Serial No. 727,796.

*To all whom it may concern:*

Be it known that I, OTHO EDWARD HESTER, a citizen of the United States, residing at Van Meter, in the county of Dallas and State of Iowa, have invented certain new and useful Improvements in Gate-Hinges; and I do declare the following to be a full, clear, and exact description of the invention, such as will enable others skilled in the art to which it appertains to make and use the same.

This invention relates to gates, and more especially to swinging gates which are vertically adjustable; and the object of the same is to produce an improved hinge for gates of this character whereby the gate may be adjusted so as to swing in a plane at a greater or lesser distance above the level of the earth as occasion may require.

The invention lies particularly in the construction of the mechanism for adjusting the height of the gate and the position at which the hinge will work—all as hereinafter more fully described and claimed, and as shown in the drawings wherein—

Figure 2:
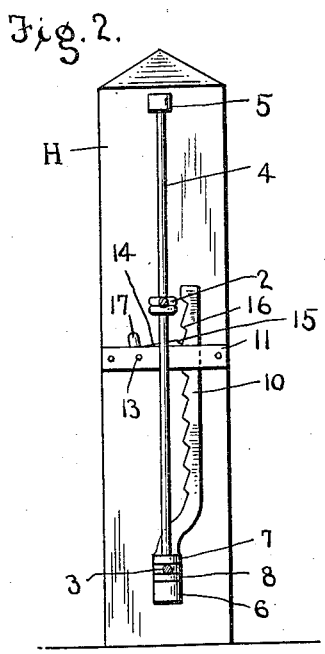
Figure 3:
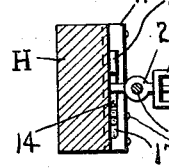
Figure 4:
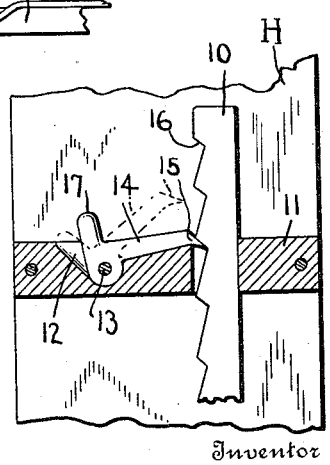

Figure 1 is a side elevation of this gate in its closed position, and Fig. 2 is a vertical section on the line 2—2 of Fig. 1. Fig. 3 is a cross section on the line 3—3 of Fig. 1. Fig. 4 is an enlarged vertical section through the bracket containing the pivoted dog, illustrating the latter in full lines as engaged with the rack bar and in dotted lines as raised out of engagement therewith.

In the drawings the letter G designates broadly a gate hingedly connected with a hinge post H at its inner edge and having any suitable form of latch for connecting its outer edge with the latch post L, provided only that this latch will operate whatever the position to which the gate is adjusted.

It is well known to farmers and stock men that it often becomes desirable to adjust a gate somewhat above the roadway, as in times of storms or when a deep snow lies on the ground, or at other times when it is desired to permit the smaller animals to pass through the gateway and exclude the larger ones. It is also well known to those experienced in this line that a clever animal, or more strictly speaking an inquisitive one, will sometimes trip the adjusting mechanism and permit the gate to fall; and one of the objects of the present invention is to so construct and locate the parts that this is rendered impossible, although the operator can instantly trip the dog with the tip of his finger.

Coming now to the details of the present invention, the inner upright bar 1 of the gate in the present instance carries two eyes 2, 3 which loosely embrace an upright rod 4 that is held rigidly in position forward of the hinge post H by any suitable means such as eye bolts 5 and 6; and the length of this rod is such that the gate may be dropped to the position shown in Fig. 1 where its lower edge will just clear the ground, or it may be raised so that the uppermost eye 2 will come in contact with the uppermost eye bolt 5 at which time the gate is as high above the ground as is ever desired. Slidably embracing said rod 4 are the perforated arms 7 and 8 of a fork 9 which is formed at or connected with the lower end of an upright rack bar 10 standing close to the inner face of the hinge post and guided along the same by means of a bracket 11 as best seen in Fig. 4. Pivoted at its angle within a recess 12 in this bracket at the point 13 is an L-shaped dog 14 whose front end or nose 15 is adapted to extend throughout the length of the recess and engage the teeth 16 of the rack bar, and whose rear end or tail 17 rises above the upper face of the bracket 11 as best seen in this view and may be reached by the tip of the operator's finger. When the parts stand in normal position as seen in this view, the nose 15 engaging the teeth 16 prevents the rack bar 10 from descending, and hence the arms of the fork 9 will hold the lowermost eye 3 of the gate in whatever position it is adjusted, while still permitting the two eyes 2 and 3 to turn around the upright rod 4. When, however, it is desired to adjust the position of the gate, if it is to be raised it is only necessary for the farmer to grasp the gate G in his hands and elevate it, and the nose 15 of the dog 14 permits the rack bar 10 to rise through the bracket 11 in a manner which will be clear. But if the desired adjustment is that the gate shall be lowered from an elevated position to which it has been set, it is necessary for him to engage his finger with the tail 17 of the dog and trip the latter to the dotted position shown in Fig. 4, meanwhile elevating the gate so that its weight will be taken off of the nose 15 of said dog. When pressure on the tail 17 is released, the dog falls back to the full-lined position of Fig. 4, and the parts are locked so that the gate cannot descend farther. When the gate is lowered to its extreme lowest position, the fork 9 inclosing the lowermost eye 3 rests upon the lowermost eye bolt 6 and all weight is taken off of the rack bar. The latter, as above stated, slides close to or by preference contacts with the inner face of the hinge post, and stands close behind the upright rod 4; and the bracket 11 will extend across the hinge post in rear of said rod, so that the dog 14 (which may be extremely small) stands to one side of said rod and close against the face of the post H where the stock cannot reach it but the operator's finger may do so.

The parts are by preference entirely of metal, properly treated to prevent rust, and as all are exposed they may be readily cleaned when necessary.

What is claimed as new is:

1. The combination with a gate having a pair of eyes in its inner upright bar, a hinge post having a pair of eye bolts spaced farther from each other than are said eyes, and an upright rod connecting the eye bolts and passing through said eyes; of a fork having perforated arms embracing said rod and standing astride the lowermost eye in the gate, the shank of the fork being extended into an upright-rack bar, a bracket secured to the face of said post and having an upright guide through which said rack bar slides and a recess in its upper face, and a dog pivoted within said recess with its body lying across the same and its nose normally engaging the teeth of said rack bar and its tail upstanding above said recess, for the purpose set forth.

2. The combination with a gate having a pair of eyes in its inner upright bar, a hinge post, and an upright rod of greater length than the height of the gate and connected at its extremities with said post; of an upright rack bar having at its lower end an arm with a perforation loosely embracing said rod beneath the lowermost eye, a bracket secured to the post and having a guide through which said rack bar slides, and an L-shaped dog pivoted at its angle to said bracket with its nose normally engaging the teeth of said rack bar and its tail extending upward alongside the post and within reach of the operator's finger.

3. The combination with a gate having a pair of eyes in its inner upright bar, a hinge post, and an upright rod of greater length than the height of the gate and connected at its extremities with said post; of an upright rack bar having at its lower end an arm with a perforation loosely embracing said rod beneath the lowermost eye, a guide carried by the inner face of the post and through which said rack bar moves, and a dog pivoted to said guide and normally engaging said rack bar.

In testimony whereof I have hereunto set my hand in presence of two subscribing witnesses.

OTHO EDWARD HESTER.

Witnesses:
O. V. WHITE,
R. E. MALANDER.

---

Copies of this patent may be obtained for five cents each, by addressing the "Commissioner of Patents, Washington, D. C."